United States Patent [19]

Cohen et al.

[11] Patent Number: 5,260,041
[45] Date of Patent: Nov. 9, 1993

[54] METHOD FOR THE CALCINATION OF LIMESTONE

[75] Inventors: Sidney M. Cohen, Allentown; Michael E. Prokesch, Bethlehem; William E. Lindquist, Schnecksville, all of Pa.

[73] Assignee: Fuller Company, Bethlehem, Pa.

[21] Appl. No.: 994,037

[22] Filed: Dec. 21, 1992

[51] Int. Cl.$^5$ .............................................. C01F 11/06
[52] U.S. Cl. ................................... 423/175; 423/177; 423/636; 423/637; 106/464; 106/817; 432/14; 432/19
[58] Field of Search .............. 106/464, 817; 423/175, 423/636, 637, 177; 432/14, 19

[56] References Cited

U.S. PATENT DOCUMENTS

| | | | |
|---|---|---|---|
| 4,210,632 | 7/1980 | Rourke | 423/637 |
| 4,321,239 | 3/1982 | Bildjukevich et al. | 423/637 |
| 4,368,177 | 1/1983 | Schnabel et al. | 423/177 |
| 4,382,779 | 5/1983 | Füssl | 423/637 |
| 4,389,381 | 6/1983 | Dinovo | 423/637 |
| 4,483,831 | 11/1984 | Schmidt et al. | 423/175 |
| 4,737,191 | 4/1988 | Meynardi | 106/817 |
| 4,828,620 | 5/1989 | Mallow et al. | 423/637 |
| 5,037,477 | 8/1991 | Tokarz et al. | 106/464 |
| 5,075,093 | 12/1991 | Tanaka et al. | 106/464 |
| 5,084,254 | 1/1992 | Golley | 106/464 |

FOREIGN PATENT DOCUMENTS 2122201 11/1972 Fed. Rep. of Germany ...... 106/817

*Primary Examiner*—Anthony Green
*Attorney, Agent, or Firm*—Daniel De Joseph

[57] ABSTRACT

A process for the continuous production of a calcined product containing a high level of reactive oxide valves, from a preheated raw material containing calcium carbonate values, said process comprising, (a) introducing the preheated raw material to the bottom of a generally vertically oriented gas suspension calcining furnace, whereby said preheated raw material is thereafter suspended in an ascending stream of heated gas to thereby pass vertically upwardly through the gas suspension calcining furnace;

(b) passing the ascending gas stream through a plurality of burners, into which fuel and air are injected, that are vertically spaced from each other, in the gas suspension furnace, at a number of levels in the flow direction of the heated gas, and (c) collecting the calcined product.

15 Claims, 5 Drawing Sheets

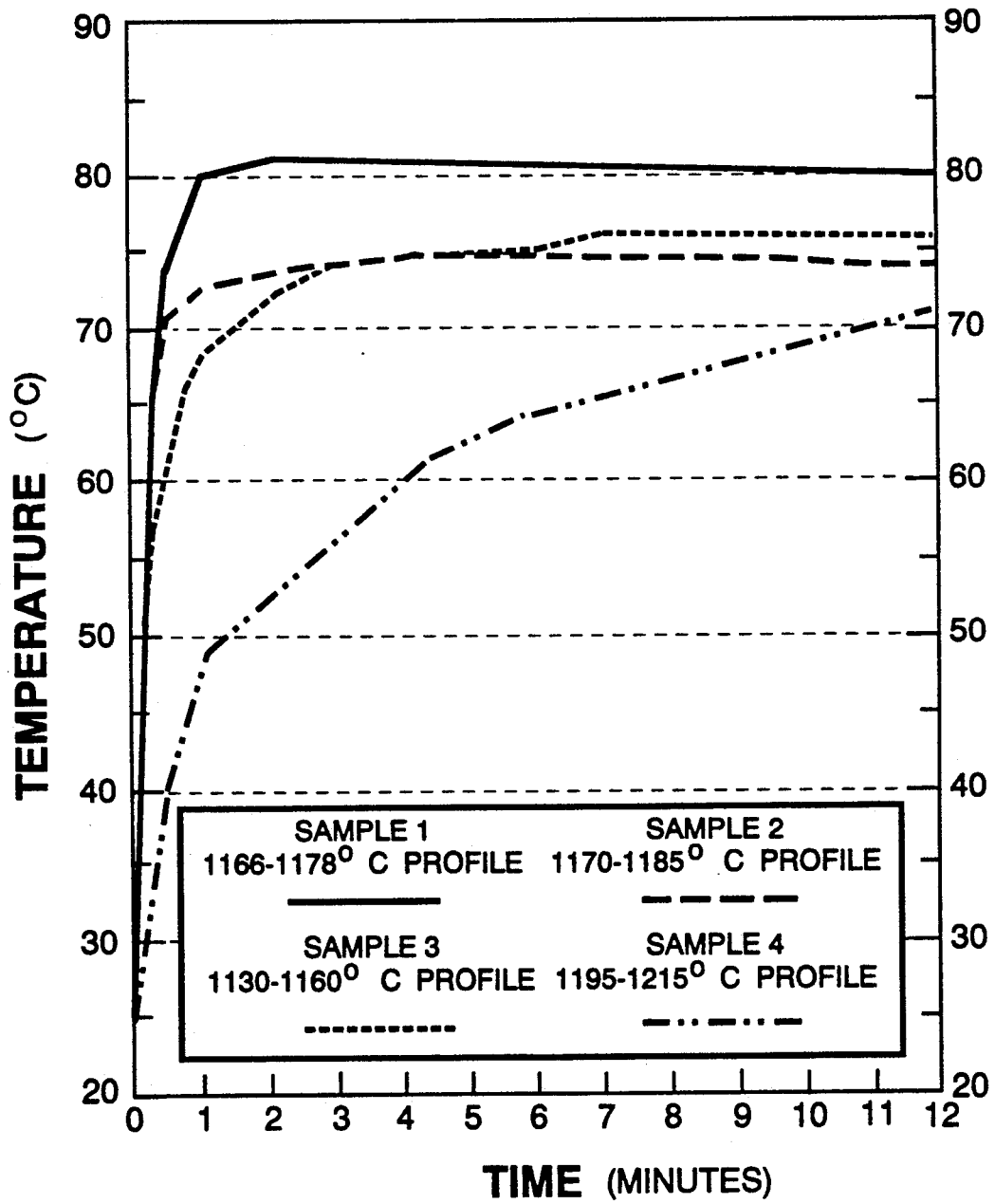

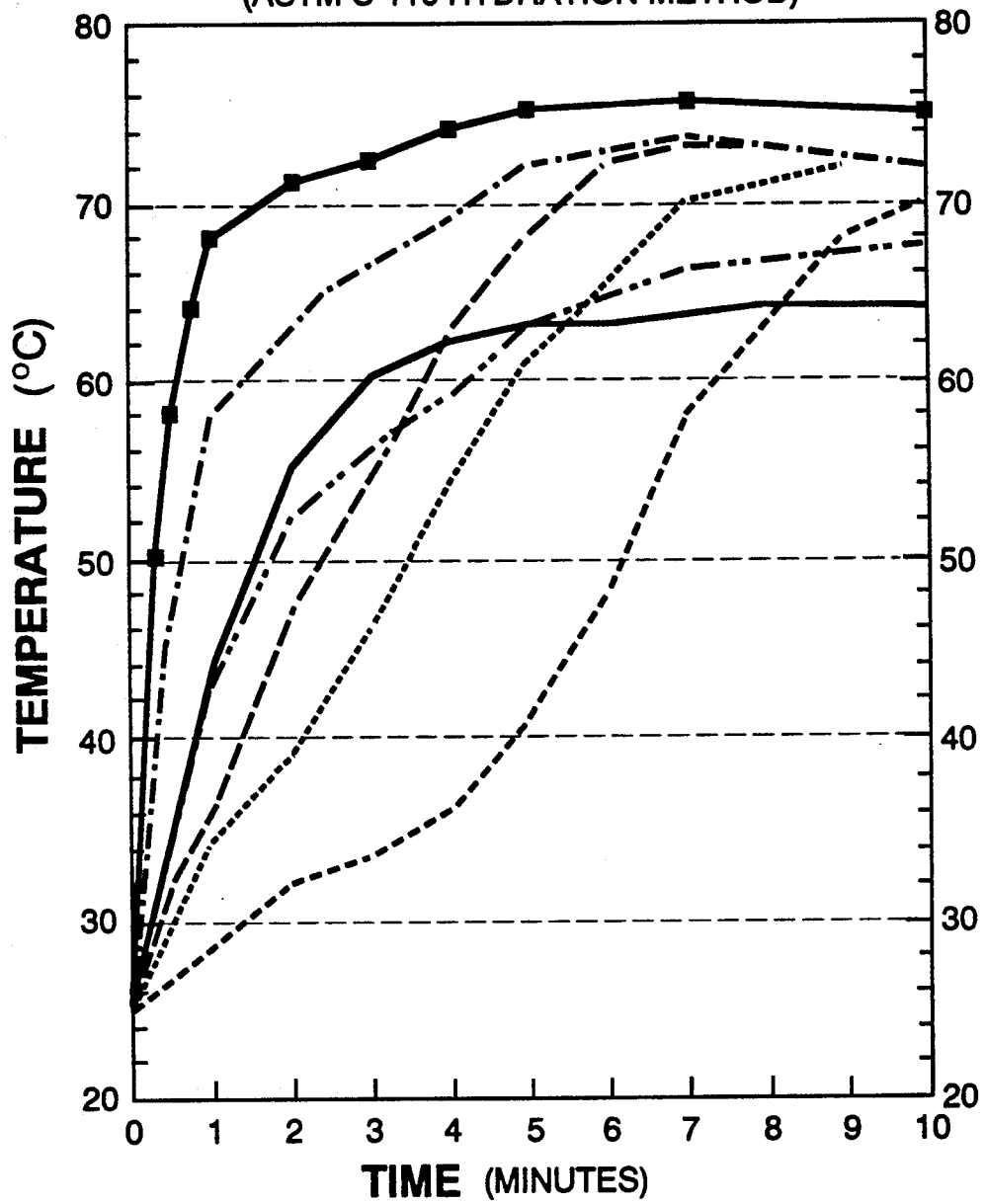

METHOD FOR THE CALCINATION OF LIMESTONE

FIELD OF THE INVENTION

The invention relates to a method of flash calcinating limestone and dolomite fines.

This invention relates to a process and apparatus for maximizing the availability of lime and dolime products and controlling recarbonization and reactivity. The process may be utilized to calcine the vast quantities of high quality waste limestone and dolomite screening fines which exist at many calcining plants. In addition, crystalline limestones and dolomite stones (which break down during handling), natural occurring fine aragonites, and limestone sands can also be treated by the flash calcination system of the present invention to produce a quality lime or dolime product.

In many cases it may be possible for flash calcination to recover the dust catch materials which are currently blown out of the back end of rotary kiln and fluid bed processes, which are collected in cyclones, baghouses, etc., and then disposed. This partially calcined material has been creating a major disposal problem because of its limited market potential.

Attempts have been made to use fluid bed reactors to calcine limestone and dolomite fines, but dust losses in the waste gas to the cyclone and baghouse in excess of 20% of the feed have occurred. As with the kiln dust, the material is partially calcined (35-40% calcination), and cannot be used as either pure lime, or pure limestone; therefore creating disposal problems in some areas.

A major portion of these limestone and dolomite waste materials are made up of screening fines as coarse as $\frac{1}{4}$". The use of stone preheaters on rotary kilns and calcimatic units make it necessary to remove this fine fraction before the feed enters the process. Also, when the end-product is used for metallurgical lime (which requires a $+\frac{1}{4}$" product), the $-\frac{1}{4}$" fraction is usually removed from the limestone before feeding, thus generating another waste material. All of these materials are added to the growing waste piles of fines that are being given away below their potential value as a lime source.

The present interest in fine lime and dolime products has come about due to new potential markets for these products, which did not exist in any significant amount previously. Prior to these emerging markets, it was difficult to sell fine lime. Therefore, there was little interest in processing these materials. Some of the current market areas for fine lime include:
1. Soil stabilization
2. FGD scrubbers (power stations)
3. Direct injection of lime into boilers for $SO_2$ control
4. Precipitated carbonate for paper coating
5. Waste stream neutralization
6. Mining and recovery applications of copper, gold and alumina ores
7. Chemical grade hydrates One use of fine lime of extreme interest is the injection of lime, or dry hydrate, into boilers at the 1200°-1500° F. gas temperature location to reduce $SO_2$ emissions. This use has been found to obtain up to 50% sulfur reduction in such equipment, which is of interest to producers in view of the current requirements of the new Clean Air and Acid Rain legislation.

The flash calcination product produced by the present process has produced products having a high surface area (B.E.T. Surface Area). It has been found that most limes produced in the present flash calcination system show up to 5 times greater surface area (2 times greater as hydrate) than other lime producing systems. B.E.T. surface area has been directly related to $SO_2$ absorption in many studies. In the case of hydrate for flue gas desulfurization (FGD) use in the power industry, the hydrate B.E.T. surface area has been found to be 30-40 $m^2/g$ for some flash calciner products compared to an average of 18 to 22 $m^2/g$ for current commercially available hydrated lime from rotary kilns.

The heart of any flash calciner system is the calcining furnace itself. It has been discovered that a higher degree of calcination is required for lime and dolomite as composed to cement raw materials, which are commonly processed in such flash calcining systems. A longer retention time or more flame quenching time is necessary to produce a good quality lime or dolime having the desired properties.

The present process has been found suitable for processing fines of limestone and dolomite. In the present process fuel (coal, gas or oil) and air are injected at controlled rates at multi-levels of the flash calcining unit, with the objective being to have flame quenching at different levels to a control temperature profile. The incoming feed is preheated by the off-gases from the furnace in a series of cyclone preheaters, and is gravity fed into the base of the furnace. In the preferred embodiment of the present invention, the intimate mixing of the fuel, air, and feed material will produce a uniform temperature pattern in the furnace by independent control of each burner on all burner levels. Typically, in the preferred embodiment, the furnace temperature profile will be maintained within 100° C. throughout, and most preferably within 50° C. throughout. It is understood, however, that a uniform temperature profile may not be necessary for all applications.

The invention allows for processing of feed sizes of 10 mesh top size due to the repeated flame quenching of these coarser particles. Previous work on flash calcination using only fuel injection at the bottom was on fine top sized materials limited to 20 mesh. The use of a coarser top size reduces the amount of extreme fines, which in some cases affects the flowability of the materials in the preheat section.

The coarser top size has a considerable impact on the cost of preparation in the milling area of the feed material going from grinding to cheaper crushing applications.

SUMMARY OF THE INVENTION

The invention relates to a method for heat treatment of fine calcium carbonate bearing material using a vertically oriented gas suspension calciner comprising:
(a) preheating fine material;
(b) delivering preheated material into a vertically arranged gas flash calciner furnace that has a plurality of burners located in a spaced vertical arrangement up the height of the burner; and
(c) collecting a product.

BRIEF DESCRIPTION OF THE DRAWING

The invention will be described in connection with the annexed drawings which are not considered to limit the invention.

FIG. 5 and 6 illustrates the hydration curves from samples processed according to the present invention.

DETAILED DESCRIPTION OF THE INVENTION

Figure 1:
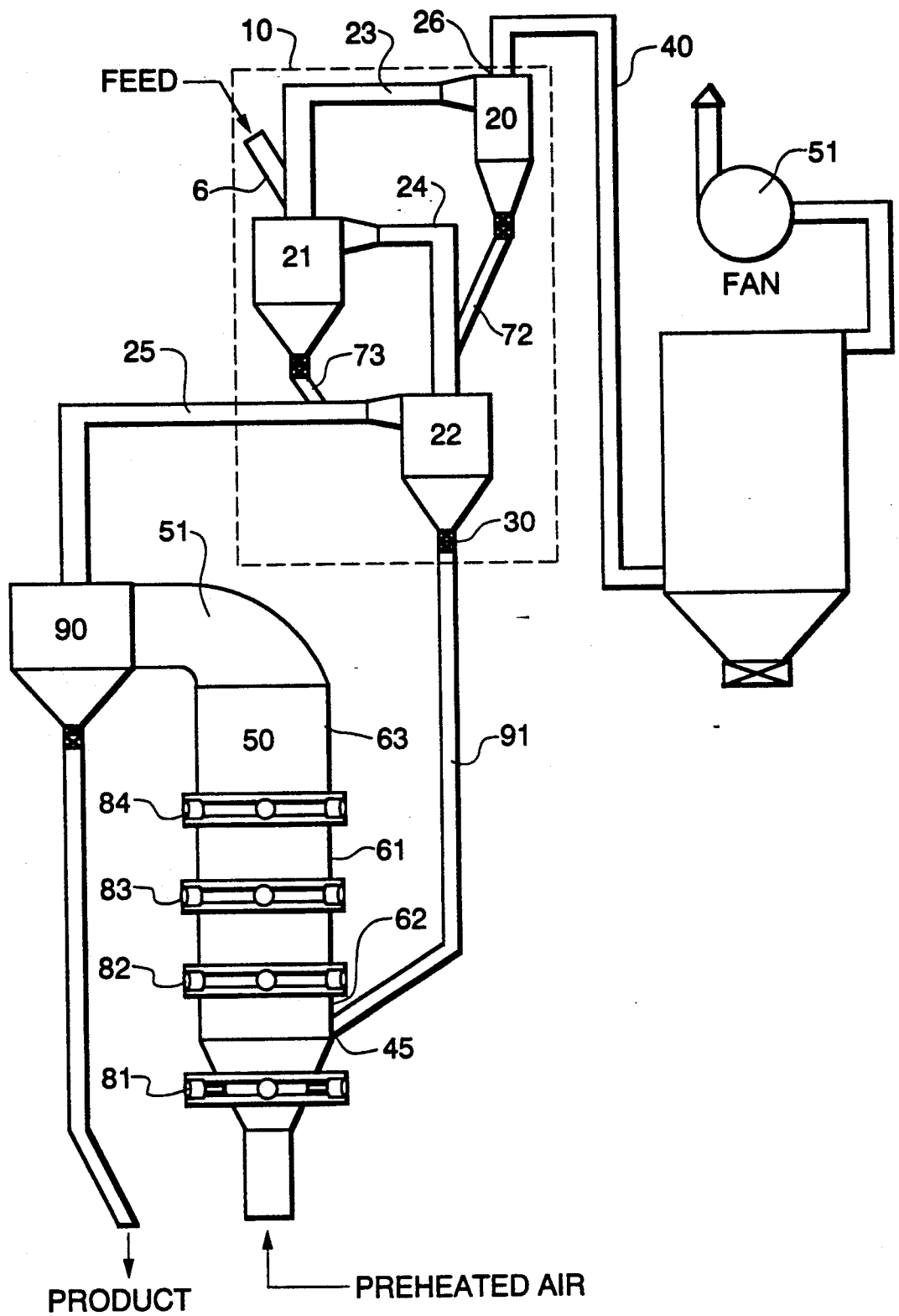
FIG. 1 illustrates a calcining system of the present invention.

Referring to FIG. 1, feed is distributed to the system via conduit 6 where it is first preheated in the preheater section generally indicated by 10. In the preheater 10, all free and bound moisture is removed from the material. In the drawing, the preheater consists of cyclones 20, 21 and 22 and the associated duct work 23, 24 and 25 which serve to preheat the dried material while suspended in a stream of hot gas. It should be understood that the preheater may be a single stage cyclone or more than one stage may be used. In a typical operation, 1 to 4 stages of a suspension preheater can be used depending on the operating temperature of the calciner and the rate of heat transfer between material and hot gases. In the embodiment depicted in FIG. 1, three cyclones are utilized in the preheat stage. The temperature in the first preheat cyclone will be approximately 500° C.; the temperature in the second preheat cyclone will be approximately 700° C., while the temperature in the third preheat cyclone will be approximately 900° C. These temperatures can vary considerably depending on material feed rates, the quantity of process gas flow, flash furnace temperatures, and the degree of radiation losses from the system.

The flow of material in the preheater is generally countercurrent to the flow of hot gas, in the sense that material will travel in the preheater from cyclone 20 to cyclone 21 to cyclone 22, while hot gas will travel from cyclone 22 to cyclone 21 to cyclone 20. Thus, the preheater 10 includes an inlet 6, which leads to conduit 23, for material to be processed, an outlet 26 for spent preheating gas and an outlet 30 for preheated material. Thus, the preheater 10 serves to carry out the process step of drying solid material while said material is in suspension in hot spent preheater gases, which gases travel to preheater 10 from flash calciner 50. Exhaust gas from the preheater 10 is supplied through conduit 40 to a high efficiency dust collector 15 such as a scrubber or fabric filter baghouse with the cleaned air being supplied via fan 51 to exhaust.

Feed material is generally 10 mesh or finer. Feed material enters into an off-gas stream via conduit 23 from preheater 10. Thus, the feed material is preheated while being conveyed to preheater 20 via conduit 23. In preheater 20 the material is mixed with heated gas and is separated from it. The gas becomes spent gas and exits to dust collector 15. The separated preheater material now drops into another duct 72 and enters, via duct 24, second stage preheater 21 where it is preheated by the gas of preheater 22 to a higher temperature. The material is then separated from that gas which goes on to preheat the material introduced via conduit 6 as mentioned above. The material then drops from cyclone 21 via conduits 73 and 25 to the third stage preheater 22 which is heated by the gas from collection cyclone 90. The material exits cyclone 22 at point 30 and enters, via conduit 91 and entry point 45, flash calciner 50 wherein it will enter the calcining zone, which, as indicated below, contains temperature controls for facilitating maintaining the temperature at a desired processing temperature for the particular material being processed.

The apparatus of the present invention includes a vertically oriented elongated suspension or calcining furnace generally indicated at 50 and defined by a vertical calcining column 61 having a lower end, generally indicated as 62 and an upper end generally indicated as 63. There will be at least one entry point for material to be processed. In the embodiment of FIG. 1, material will enter vessel 50 at point 45, which in FIG. 1 is located near the bottom 62 of vessel 50. However, the material may be introduced at any point in the vessel, depending on the desired qualities of the product to be produced by the process of the present invention. After entering vessel 50, the material will be entrained in a stream of air, which is preheated by an air heater (not shown) prior to entering flash calciner 50. The entrained material will then be conveyed up the ascending length of the vertical calcining column.

Figure 4:
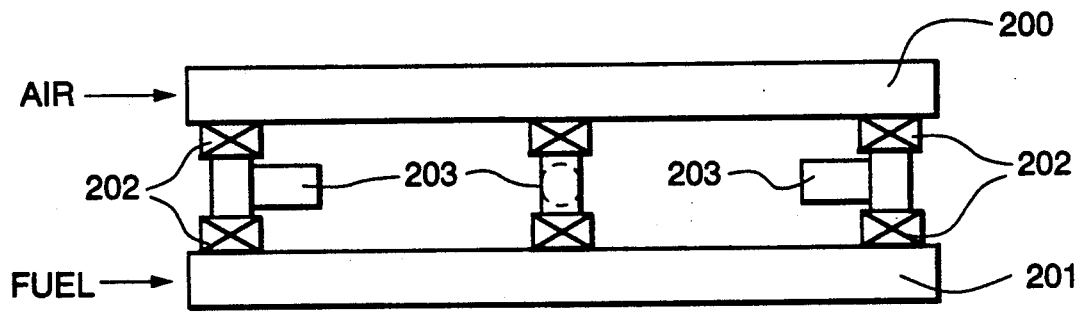
FIG. 4 illustrates a fuel/air manifold arrangement utilized in the present invention.

In spaced axially relation along the ascending column 61 are burners 81, 82, 83 and 84, which, as shown in FIG. 4, are comprised of separate manifolds, 200 and 201, for, respectively, air and fuel which lead into metering valves 202 for burners 203. Preferably, in at least one burner level, there are a plurality of burners circumferentially spaced around the furnace in a single horizontal plane. Most preferably, the burners are individually controlled. Typically, the burner located closest to the bottom 62 of the gas calcining furnace will be located in the vicinity of material inlet point 45, and generally will in fact be located below material inlet point 45 in order to increase the gas temperature from the preheater up to the temperature required for calcination prior to material contact. The objective of having a plurality of burners at a multiple of levels of the gas suspension calciner 50 is to have more flame quenching retention time for the limestone and/or dolomite preheated raw material at a controlled uniform temperature profile. In addition, increasing the material's direct exposure to combusting fuel decreases the total retention required in the furnace and allows for a larger particle to be calcined, ideally 10 mesh or larger. Varying this uniform temperature profile will allow the precise adjustment of material reactivity (hydration rates) to meet the requirements of a wide range of applications.

The present system is adaptable for using both solid and liquid fuels. Both solid and liquid fuels may be simultaneously utilized at different burner levels.

Figure 2:
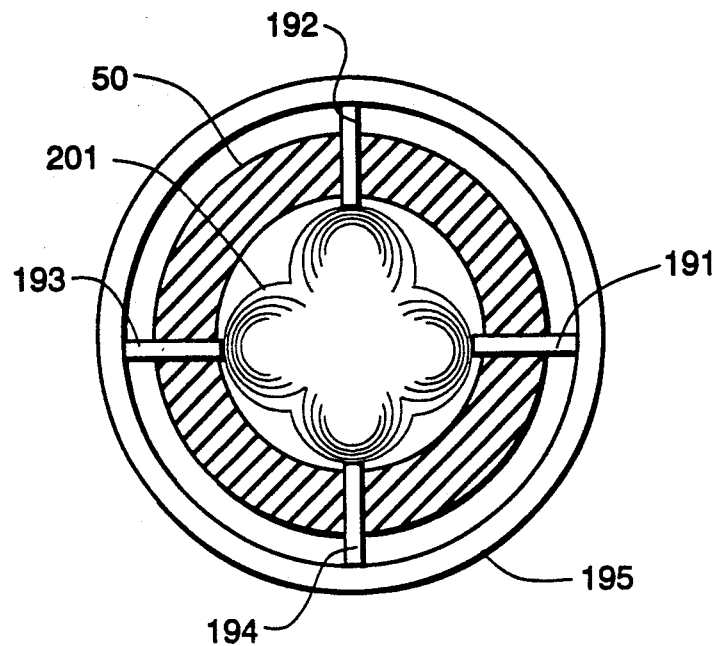
FIG. 2 illustrates one embodiment of a burner system of the present invention.

FIG. 2 is illustrating another embodiment of the present invention, and is a cross-section across the radial axis of the gas suspension calciner unit 100 which depicts four burners 191, 192, 193 and 194 being evenly spaced circumferentially around furnace 50 in a single horizontal plane. Burners 191, 192, 193 and 194 are fed by fuel/air manifolds 195. When such burners are evenly spaced and are fed with identical amounts of a consistent fuel/air mixture, there will be produced a uniform flame pattern, indicated by numeral 201, in the horizontal plane in which burners 191, 192, 193 and 194 are located. This flame pattern, as illustrated in FIG. 2, will preferably encompass substantially the entire furnace cross-sectional area in order to guarantee contact between material and combusting fuel at each level, although, a less extensive flame pattern may be acceptable depending upon the needs of the practitioner of the invention. A flame pattern encompassing substantially the entire cross sectional area is generally produced by there being a plurality of burners at each burner level, although the number of burners needed to maintain a uniform flame pattern will be dependent to some extent on factors such as the interior cross-sectional area of the furnace. Typically, two to four burners on each level, circumferentially spaced around the furnace in each horizontal plane, will give the requisite flame pattern for the preferred embodiment of the invention.

Figure 3:
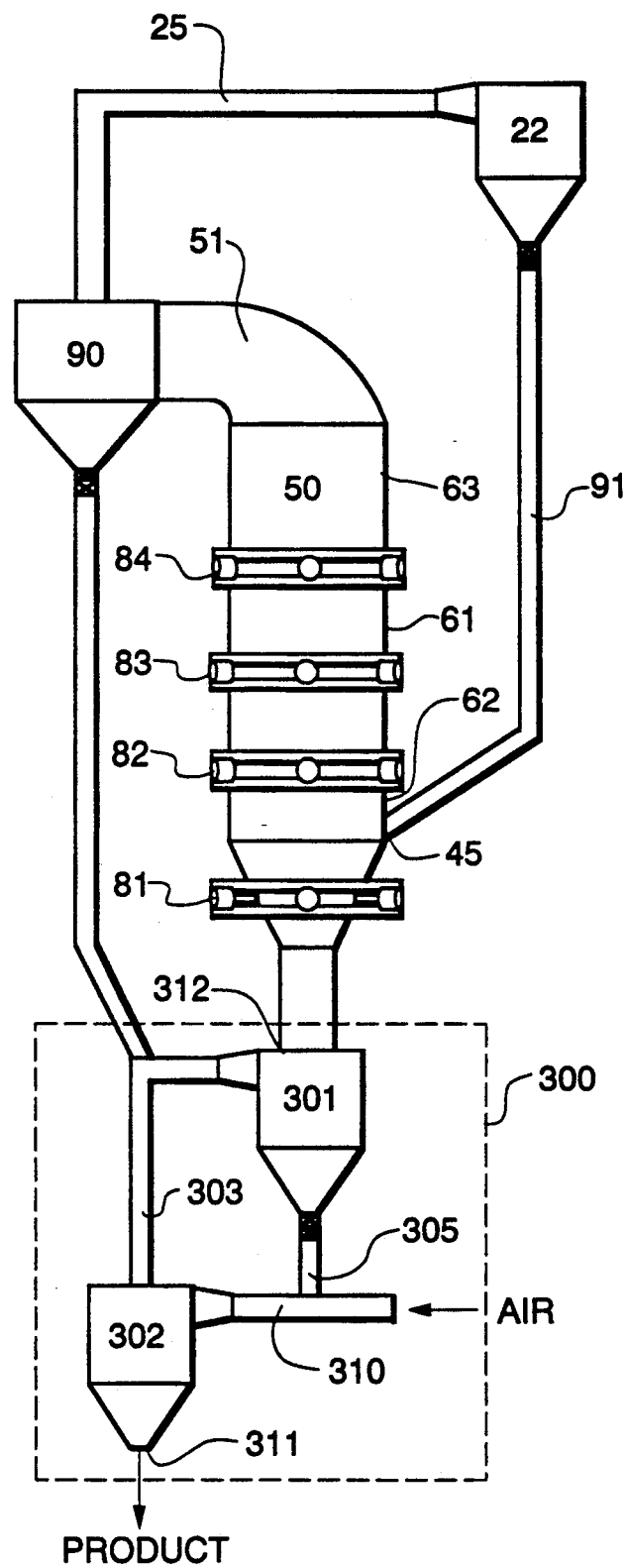
FIG. 3 illustrates another embodiment of a calcining system of the present invention.

After exiting the flash calciner 50 the calcined material will pass to cyclone separator 90, where it will be separated from the heated gas and passed to product. Optionally, the calcined material will be introduced into one or more cooling cyclones where it will intermix with cooling air. Such a material cooler is generally indicated in FIG. 3 at 300 and is a device for cooling the material by suspending it in ambient air and is shown as a pair of serially connected cyclones 301 and 302 each having an inlet for gas and entrained material, an outlet for separated solids and an outlet for separated gas. Ambient air is pulled through the system through a conduit 310 to cyclone 302. A duct 303 interconnects the outlet for separated gas of cyclone 302 with the inlet for gas and entrained solids of cyclone 301. The solids outlet of cyclone 301 is connected to duct 305 to conduit 310. Cyclone 301 separates the product from the cooling gas and supplies it through an outlet 305 to conduit 310 where it is again entrained in the cooling gas further cooled and conveyed to cyclone 302. Cyclone 302 discharges product or processed material through outlet 311 and cooling gas through conduit 303. The cyclone 301 discharges air for combustion through an outlet 312 to the calciner furnace 50.

With the present invention, it has been found desirable to maintain the temperature within the calciner furnace approximately between 1000° C. and 1250° C. to produce a lime product with the desired reactivity, while the temperature difference throughout the upper and lower sections of the furnace is preferably less than 100° C., and most preferably less than 50° C. The exit gas temperature at outlet 51 should also preferably be maintained in the temperature differential range mentioned above. Product discharged from cyclone 90 will have a temperature within 100° C. to 300° C. of the furnace exit temperature, and ideally above 900° C. to prevent recarbonization. It is to be understood that for thermal processing of limestone, other temperatures may be appropriate and those skilled in the art will be able to achieve the desired temperature through routine experimentation. For example, processing temperature in the calciner for highly reactive lime is between about 1100° C. to about 1150° C.

Also, With the calcining of limestone, it has been found that the oxygen content within the calcining furnace should be preferably maintained approximately in the range of about 1 to 2% while the oxygen content in the duct 51 would be maintained between approximately 2 and approximately 4%, to maximize efficiency of the system.

The desired retention time within the furnace is obviously dependent on the reactivity of the material being processed. The retention time is obviously, a function of the velocity of the gas stream through the furnace. For most applications, when the burner means consists of individually controlled burners the velocity of the gas stream through the furnace will range from between approximately 3 meters/second to approximately 12 meters/second, although velocities outside this range can be utilized depending upon the material being processed.

Typical chemistry of limestone fine materials as recovered from three different lime plants are shown in Table 1. These materials were prepared to either −20 mesh or −10 mesh depending on the percentage of −200 mesh produced during preparation. The −200 mesh fraction for this step was to be controlled to be less than 20%. For the example shown, analysis of the prepared products at 20 mesh show 27.0% −200 mesh and 15.3% when prepared to −10 mesh. This will vary on individual limestone or dolomite materials and in the use of selected reduction methods.

The products produced from the invention described, based on the main properties, gave the results shown in Table 2. The temperature profile change allowed by the invention of the furnace, shown on the two sample 3 listings, shows the effect of change or control of reactivity as defined by ASTM C-110 hydration rate methods. A 60° C. change in the overall profile changed the 40° C. rise from 0.8 minutes to 7 minutes, which is desired by some potential end uses of products from such a system. This is also illustrated in FIG. 5.

FIG. 6 compares the reactivity control of the described invention illustrating the capability to match up hydration rate curves of other main processing methods to show the control available by the invention described which is not possible in the other methods shown.

The control of the amount of residue $CO_2$ in end product is also shown in Table 2 where residue of as low as 0.14% $CO_2$ are shown. This is achieved while obtaining high total available oxides in the products as shown. These total available oxides represent 97-98% of the potential total oxides possible from these examples. Other processing methods, due to their longer retention times at temperature 30 minutes to 2+ hours, usually have lower available oxide efficiencies.

The other unique feature of this invention is to produce a product with higher surface areas which is a factor in the materials use in FGD systems to absorb $SO_2$. In Table 3, the three material examples gave the results as shown in terms of surface area of produced lime and a resulting hydrate produced from each case. The higher level of surface area which has a range of 27-33 $m^2/g$ compared to 22 $m^2/g$ from hydrate made from lime from other conventional systems found. It is believed this level of 40-60 $m^2/g$ surface area hydrate product can be produced from products produced by this invention. It has been discovered that the calcined product produced by the present invention can be agglomerated or briquetted to form a coarse lime product, generally in the size or normal pebble lime (+¼" size).

TABLE 1

CHEMICAL ANALYSES TEST MATERIALS

|  | SAMPLE 1 | SAMPLE 2 | SAMPLE 3 |
|---|---|---|---|
| $SiO_2$ | 1.25 | 2.08 | 3.46 |
| $Al_2O_3$ | 0.47 | 0.52 | 0.53 |
| $Fe_2O_3$ | 0.22 | 0.27 | 0.16 |
| CaO | 52.69 | 49.76 | 52.53 |
| MgO | 1.82 | 3.90 | 0.80 |
| $K_2O$ | 0.21 | 0.17 | 0.17 |
| $Na_2O$ | 0.07 | 0.06 | 0.31 |
| $SO_3$ | 0.22 | 0.24 | 0.14 |
| LOI | 43.12 | 43.04 | 41.76 |
| TOTAL | 100.07 | 100.04 | 99.87 |

TABLE 2

| | LIME PRODUCTS | | | |
|---|---|---|---|---|
| | SAMPLE 1 | SAMPLE 2 | SAMPLE 3 | SAMPLE 3 |
| TEMP. PROFILE | 1166–1178° C. | 1170–1185° C. | 1130–1160° C. | 1195–1215° C. |
| RESIDUE $CO_2$ | 0.36 | 0.25 | 0.15 | 0.14 |
| HYDRATION RATE 40° C. RISE IN MIN. ASTM-C110 | 0.25 | 0.35 | 0.8 | 7 |
| TOTAL AVAILABLE OXIDES | 93.50 | 89.94 | 87.6 | 90.3 |

TABLE 3

| | PRODUCTS B.E.T. SURFACE AREA | | |
|---|---|---|---|
| | SAMPLE 1 | SAMPLE 2 | SAMPLE 3 |
| ROTARY KILN PROD. | | | |
| LIME | — | 1.22 M²/G | — |
| HYDRATE* | — | 22.34 M²/G | — |
| FLASH CALC. PRODUCT | | | |
| LIME | 4.87 M²/G | 4.98 M²/G | 4.51 M²/G |
| HYDRATE* | 29.07 M²/G | 33.29 M²/G | 27.58 M²/G |

*STANDARD ASTM-C-110 METHOD HYDRATE PRODUCT

It should be evident that various modifications can be made to the described embodiments without departing from the scope of the present invention. For example, the present invention may be utilized in the treatment of many different materials than those exemplified.

We claim:

1. A process for the continuous production of a calcined product containing a high level of reactive oxides from a preheated calcium carbonate containing raw material, said process comprising,
   a. introducing the preheated raw material to the bottom of a generally vertically oriented gas suspension calcining furnace maintained at a temperature sufficient to calcine said raw material, whereby said preheated raw material is thereafter suspended in an ascending stream of heated gas to thereby pass vertically upwardly through the gas suspension calcining furnace;
   b. passing the ascending gas stream through a plurality of burners into which fuel and air are injected, said burners being vertically spaced from each other in the gas suspension furnace at a number of levels, and
   c. collecting the calcined product.

2. The process of claim 1 wherein the preheated raw material is limestone.

3. The process of claim 1 wherein the preheated raw material is dolomite.

4. The process of claim 1 wherein the burners are individually controlled.

5. The process of claim 1 wherein, in at least one burner level, there are a plurality of individually controlled burners circumferentially spaced around the furnace in a single horizontal plane.

6. The process of claim 5 wherein there are four burners evenly spaced around the circumference of the furnace in a single horizontal plane.

7. The process of claim 5 wherein, in more than one burner level, there are a plurality of individually controlled burners circumferentially spaced around the furnace in a single horizontal plane.

8. The process of claim 4 wherein the individually controlled burners generate a flame profile throughout substantially the entire furnace.

9. The process of claim 4 wherein the furnace is maintained, throughout its height, at a uniform temperature that does not vary more than 50° C. from its lowest temperature point to its highest temperature point.

10. The process of claim 1 wherein at least one burner is located below where raw material is introduced into the gas suspension calcining furnace.

11. The process of claim 1 wherein the fuel utilized is solid fuel.

12. The process of claim 1 wherein the fuel utilized is liquid fuel.

13. The process of claim 1 wherein the raw material has a top size of 10 mesh or finer.

14. The process of claim 1 wherein the calcined product is agglomerated or briquetted to produce a coarse calcined product.

15. The process of claim 4 wherein the velocity of the gas stream through the furnace ranges from between approximately 3 meters/second to approximately 12 meters/second.

* * * * *